F. A. HAGERMAN.
EVENER.
APPLICATION FILED MAY 5, 1916.
1,242,179.
Patented Oct. 9, 1917.
2 SHEETS—SHEET 1.
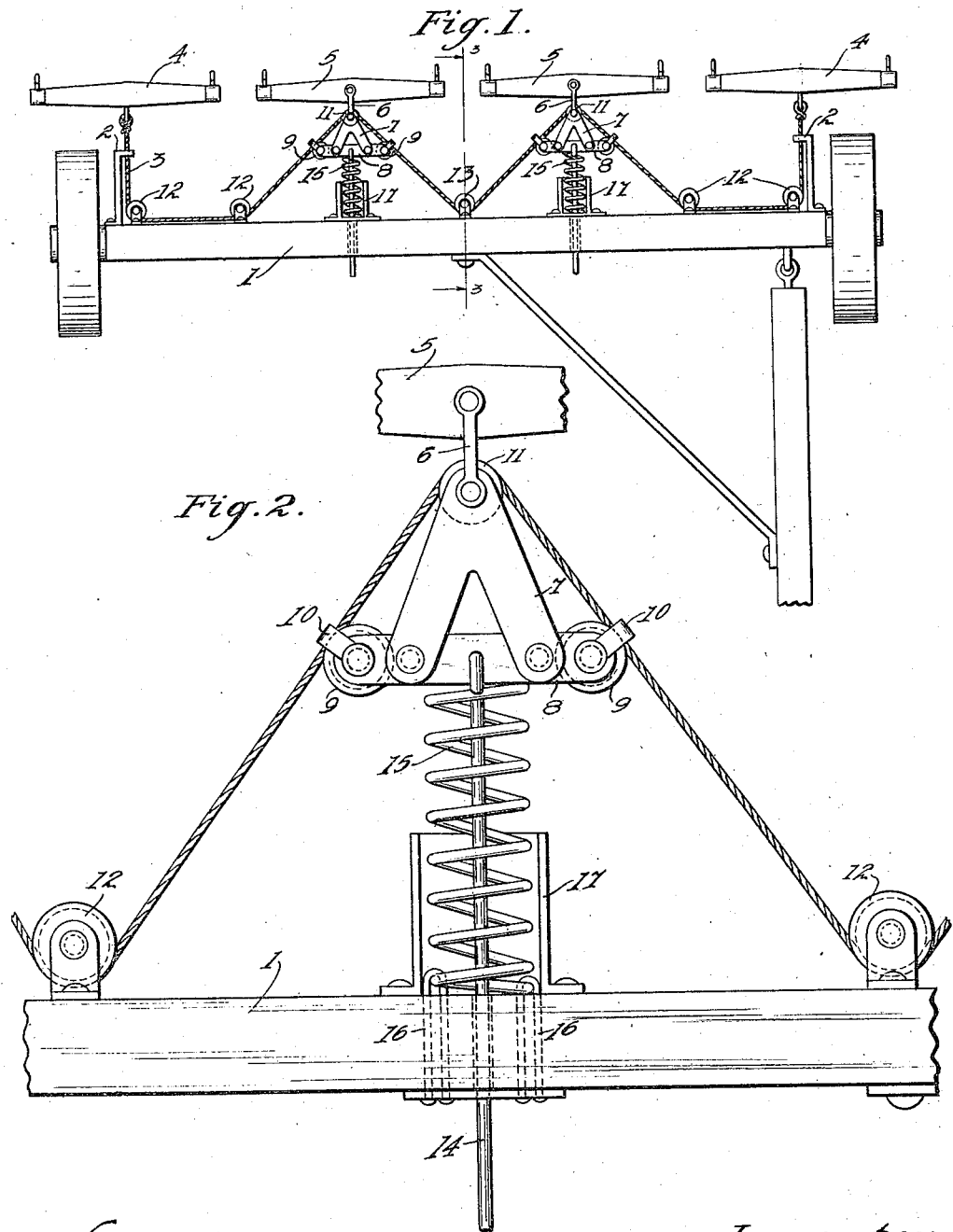
Witnesses
Paul A. Viersen
Grace Thompson.
Inventor
F. A. Hagerman
H. J. Sanders
By
Atty.

F. A. HAGERMAN.
EVENER.
APPLICATION FILED MAY 5, 1916.
1,242,179.
Patented Oct. 9, 1917.
2 SHEETS—SHEET 2.
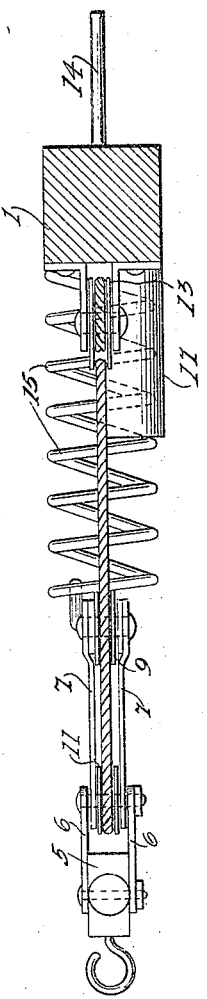
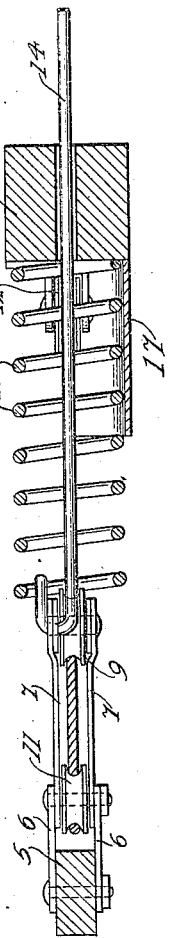
Witnesses
Paul A. Viersen
Grace Thompson
Inventor
F. A. Hagerman
H. J. Sanders
By Atty.

UNITED STATES PATENT OFFICE.

FRANK A. HAGERMAN, OF STROMSBURG, NEBRASKA.

EVENER.

1,242,179.  Specification of Letters Patent.  Patented Oct. 9, 1917.

Application filed May 5, 1916. Serial No. 95,695.

*To all whom it may concern:*

Be it known that I, FRANK A. HAGERMAN, a citizen of the United States, residing at Stromsburg, in the county of Polk, in the State of Nebraska, have invented certain new and useful Improvements in Eveners, of which the following is a specification.

This invention relates to improvements in four horse eveners and its object is to produce a device of this class that is simple, durable and efficient and that is cheap to manufacture. The main object of the invention is to provide a device whereby the load will be evenly distributed among the draft animals and at the same time sudden jerks upon one or more of the animals due to rough roads obviated.

With the foregoing and other objects in view the invention consists in the combination and arrangement of parts to be hereinafter fully described in the following specification, pointed out in the appended claims and illustrated in the accompanying drawings which form a part of said specification and in which—

Figure 1 is a plan view of my device applied to the draft beam of a vehicle.

Fig. 2 is an enlarged plan view of a portion of the device.

Fig. 3 is a section taken on line 3—3 of Fig. 1.

Fig. 4 is a longitudinal sectional view through Fig. 2.

Like reference characters indicate corresponding parts throughout the several views.

The reference numeral 1 denotes the draft bar of a vehicle and to the ends of the same I secure the guide arms 2, 2 through the apertured free ends of which the draft rope 3 extends, the ends of said rope being fastened to the two outside swingletrees 4, 4. The relatively inner swingletrees 5, 5 carry links 6 that are connected to the V-shaped castings 7 which carry the cross arms 8 which carry the guide rollers 9 and the guide straps 10 that pass over said guide rollers. A guide roller 11 is carried by each of the castings 7 also. The draft rope passing from one outside swingletree 4 through the apertured end of the guide arm 2 passes beneath the guide pulleys 12 carried by the draft bar 1 and then between one guide strap 10 and its roller 9 and about the guide roller 11, then between the other guide strap 10 and its guide roller 9 and over a central guide pulley 13 carried by the draft bar, and then about the guide rollers of the remaining guide pulleys 12 and back to the other outside swingletree.

The cross arm 8 of each inner swingletree is connected by a rod 14, which serves to support the castings and swingletree when the team is unhitched, with the draft bar 1 through a perforation in which member it passes and a spring 15 encircling said rod 14 abuts the cross arm 8 and the draft bar 1 and is connected to the latter member by staples 16. A semi-cylindrical guard 17 secured to the said draft bar 1 partly encircles said spring 15. A sudden jerk by any one of the draft animals pulling in the swingletrees will be distributed, by means of the draft rope, to the several animals, the springs 15 serving as cushions to absorb the shock and at the same time to neutralize the effect of rough roads.

What is claimed is:—

1. A draft equalizer comprising a draft bar and outer and relatively inner swingletrees, castings carried by said inner swingletrees, cross bars carried by said castings, guide rollers carried by said castings and cross bars, resilient members connecting said cross bars and said draft bar, guide arms terminally carried by said draft bar and flexible draft means connecting said draft bars and swingletrees and engaging with said guide rollers.

2. A draft equalizer comprising a draft bar and outer and inner swingletrees, castings carried by said inner swingletrees, cross bars carried by said castings, guide rollers carried by said castings and cross bars, supporting bars connecting said cross bars and the said draft bar, resilient members connecting said cross bars and the said draft bar, guide arms terminally carried by said draft bar and flexible draft means connecting said draft bars and swingletrees and engaging with said guide rollers.

In testimony that I claim the foregoing as my own I have hereto affixed my signature in the presence of two subscribing witnesses.

FRANK A. HAGERMAN.

Witnesses:
IRA BANTA,
ANSEL E. GRAVES.

Copies of this patent may be obtained for five cents each, by addressing the "Commissioner of Patents, Washington, D. C."